(12) United States Patent
Johnson

(10) Patent No.: US 10,099,313 B2
(45) Date of Patent: Oct. 16, 2018

(54) LINEAR FRICTION WELDING SYSTEM WITH PHASE CHANGE ASSEMBLY

(71) Applicant: APCI, LLC, South Bend, IN (US)

(72) Inventor: Stephen A. Johnson, South Bend, IN (US)

(73) Assignee: APCI, LLC, South Bend, IN (US)

( * ) Notice: Subject to any disclaimer, the term of this patent is extended or adjusted under 35 U.S.C. 154(b) by 175 days.

(21) Appl. No.: 14/820,806

(22) Filed: Aug. 7, 2015

(65) Prior Publication Data

US 2017/0036298 A1 Feb. 9, 2017

(51) Int. Cl.
*B23K 20/12* (2006.01)
*B23K 20/26* (2006.01)

(52) U.S. Cl.
CPC ........ *B23K 20/1245* (2013.01); *B23K 20/123* (2013.01); *B23K 20/26* (2013.01)

(58) Field of Classification Search
CPC ........................... F15B 15/228; B23K 20/1205
See application file for complete search history.

(56) References Cited

U.S. PATENT DOCUMENTS

| | | | |
|---|---|---|---|
| 3,058,513 A | 10/1962 | Schaub et al. | |
| 3,240,322 A * | 3/1966 | Allen | B65G 27/16 198/766 |
| 3,388,849 A | 6/1968 | Blum et al. | |
| 3,542,275 A | 11/1970 | Loyd et al. | |
| 3,554,845 A | 1/1971 | Billett et al. | |
| 3,581,610 A * | 6/1971 | Burke | B23G 1/02 82/110 |
| 3,591,068 A | 7/1971 | Farmer et al. | |

(Continued)

FOREIGN PATENT DOCUMENTS

| | | |
|---|---|---|
| DE | 102004016613 A1 | 11/2005 |
| DE | 102007031072 A1 * | 2/2008 ............. D05B 57/30 |

(Continued)

OTHER PUBLICATIONS

Thompson Friction Welding, "Linear Friction Welding Becomes a Commercial Reality," Article, West Midlands, United Kingdom, Feb. 2008 (5 pages).

(Continued)

*Primary Examiner* — Erin B Saad
*Assistant Examiner* — Carlos J Gamino
(74) *Attorney, Agent, or Firm* — Maginot, Moore & Beck, LLP

(57) ABSTRACT

A linear friction welding system in one embodiment includes a ram configured to vibrate along a welding axis, a cam follower operably connected to the ram, an eccentric including an eccentric outer periphery operably engaged with the cam follower, and an inner periphery, a first power shaft slidingly engaged with the eccentric, a second power shaft eccentrically engaged with the inner periphery, a timing component operably connected to the first power shaft and the second power shaft, a motor configured to drive the timing component, and a phase change mechanism engaged with the timing component and movable between a first position defining a first phase relationship between the first power shaft and the second power shaft, and a second position defining a second phase relationship between the first power shaft and the second power shaft.

10 Claims, 11 Drawing Sheets

(56) References Cited

U.S. PATENT DOCUMENTS

| | | |
|---|---|---|
| 3,671,049 A | 6/1972 | Stamm |
| 3,701,708 A | 10/1972 | Brown et al. |
| 3,791,569 A | 2/1974 | Mims |
| 3,822,821 A | 7/1974 | Clarke |
| 3,848,792 A | 11/1974 | Mims |
| 3,860,468 A | 1/1975 | Scherer |
| 3,920,504 A | 11/1975 | Shoh et al. |
| 3,972,465 A | 8/1976 | Takaoka et al. |
| 4,043,497 A | 8/1977 | Jones |
| 4,087,036 A | 5/1978 | Corbett et al. |
| 4,247,346 A | 1/1981 | Maehara et al. |
| 4,270,495 A | 6/1981 | Freudenstein et al. |
| 4,470,868 A | 9/1984 | MacLaughlin et al. |
| 4,552,609 A | 11/1985 | Larsen |
| 4,811,887 A | 3/1989 | King et al. |
| 4,858,815 A | 8/1989 | Roberts et al. |
| 4,905,883 A | 3/1990 | Searle |
| 4,995,544 A | 2/1991 | Searle |
| 5,100,044 A | 3/1992 | Searle |
| 5,141,591 A | 8/1992 | Boek et al. |
| 5,248,077 A | 9/1993 | Rhoades et al. |
| 5,366,344 A | 11/1994 | Gillbanks et al. |
| 5,568,982 A * | 10/1996 | Stoll ................... B23Q 1/58 384/45 |
| 5,853,119 A | 12/1998 | Searle |
| 6,003,752 A | 12/1999 | Searle et al. |
| 6,102,272 A | 8/2000 | Searle et al. |
| 6,145,730 A | 11/2000 | Wiesemann |
| 6,328,087 B1 | 12/2001 | Finzo et al. |
| 6,357,506 B1 | 3/2002 | Nomura et al. |
| 6,382,094 B1 * | 5/2002 | Chiba ................... B41L 13/04 101/115 |
| 6,481,334 B1 * | 11/2002 | Kaneko ................ F15B 15/082 92/85 R |
| 6,604,459 B2 | 8/2003 | Chiba ................... B41F 13/008 101/116 |
| 6,688,512 B2 | 2/2004 | Trask |
| 6,779,708 B2 | 8/2004 | Slattery |
| 7,290,479 B2 * | 11/2007 | Williams .............. F16C 29/00 92/15 |
| 7,882,996 B2 | 2/2011 | Alessi et al. |
| 8,070,039 B1 | 12/2011 | Johnson et al. |
| 8,181,841 B2 | 5/2012 | Johnson et al. |
| 8,376,210 B2 * | 2/2013 | Johnson .............. B23K 20/1205 228/102 |
| 8,539,764 B2 * | 9/2013 | Howard ................. F02G 1/043 60/525 |
| 8,967,216 B2 | 3/2015 | Johnson |
| 2001/0029850 A1 * | 10/2001 | Chiba ................... B41L 13/04 101/116 |
| 2004/0216432 A1 | 11/2004 | Lopez |
| 2004/0256439 A1 | 12/2004 | Pfeiler |
| 2006/0113358 A1 | 6/2006 | Crasser |
| 2006/0231593 A1 | 10/2006 | Bayer et al. |
| 2009/0145948 A1 | 6/2009 | Pfeiler |
| 2009/0321497 A1 | 12/2009 | Alessi et al. |
| 2011/0056629 A1 | 3/2011 | Kawaura et al. |

FOREIGN PATENT DOCUMENTS

| | | |
|---|---|---|
| EP | 0355867 A1 | 2/1990 |
| EP | 0999133 A1 | 5/2000 |
| GB | 1332712 | 10/1973 |
| JP | 2002153975 A | 5/2002 |
| JP | 2009298411 A | 12/2009 |

OTHER PUBLICATIONS

TWI Knowledge Summary website page "Linear Friction Welding," by Philip Threadgill, http://www.twi.co.uk/content/ksplt001.html; published at least as early as Oct. 21, 2009 (3 pages).
Addison, "Linear Friction Welding of Engineering Materials," Research Report © TWI Ltd., Feb. 2008, United Kingdom (34 pages).
Addison, "Linear Friction Welding Information for Production Engineering," Research Report © TWI Ltd. Jul. 2010, United Kingdom (46 pages).
International Search Report corresponding to PCT application PCT/US2012/067389, dated Feb. 7, 2013 (2 pages).
International Search Report corresponding to PCT application PCT/US2011/048785, dated Dec. 8, 2011 (4 pages).
International Search Report corresponding to PCT application PCT/US2012/067840, dated Feb. 8, 2013 (2 pages).

* cited by examiner

LINEAR FRICTION WELDING SYSTEM WITH PHASE CHANGE ASSEMBLY

FIELD OF THE INVENTION

The present disclosure relates to linear friction welding.

BACKGROUND

Friction welding (FW) is a process of joining two components which may be made from the same or different materials. The FW process typically involves pressing one of the two components against the other component with a large amount of force and rapidly moving one of the two components with respect to the other component to generate friction at the interface of the two components. The pressure and movement generate sufficient heat to cause the components to begin to plasticize. Once the two components are plasticized at the contact interface, the relative movement of the two components is terminated and an increased force is applied. As the components cool in this static condition, a weld is formed at the contact interface.

The weld obtained using FW is a solid state bond which is highly repeatable and easily verifiable. For example, the amount of material donated by each component to the formation of the weld, which is referred to as "upset", is well defined. Therefore, by carefully controlling the energy input into the FW system in the form of friction and forging pressure, the measured upset of a welded assembly provides verification as to the nature of the weld obtained.

As discussed above, relative movement of the two components is a critical facet of FW. Different approaches have been developed to provide the required relative movement. One widely used approach is rotational friction welding (RFW). RFW involves rotation of one component about a weld axis. RFW provides many benefits and is thus a favored welding approach in various industries including aerospace and energy industries.

RFW, however, does have some limitations. For example, in forming a weld, the interface between the two components must be evenly heated to generate a uniform plasticity within each of the components throughout the weld interface. If one area becomes hotter than another area, the material in that hotter area will be softer, resulting in an incongruity in the formed weld. To provide consistent heat generation throughout the component interface, the rotated component is necessarily uniformly shaped about the axis of rotation, i.e., circular. Moreover, since the heat generated is a function of the relative speed between the two materials, more heat will be generated toward the periphery of the rotated component since the relative speed at the periphery is higher than the relative speed at the rotational axis.

In response to the limitations of RFW, linear friction welding (LFW) was developed. In LFW, the relative movement is modified from a rotational movement to a vibratory movement along a welding axis. By controlling the amplitude and the frequency of the linear movement, the heat generated at the component interface can be controlled.

LFW thus allows for welding of a component that exhibits substantially uniform width. LFW, like RFW, is subject to various limitations. One such limitation is that LFW exhibits non-uniform heating along the welding axis due to the linear movement of the vibrated component. For example, when welding two components of identical length along the welding axis, the two components are aligned in the desired as-welded position. Due to the nature of previous LFW systems, this location corresponds to the rearmost position of the component which is moved. The leading edge of the vibrated component is then moved beyond the corresponding edge of the stationary component by a distance equal to the amplitude of the vibration. Moreover, the trailing edge of the vibrated component exposes a portion of the stationary component as the leading edge of the vibrated component moves beyond the corresponding edge of the stationary component. Accordingly, the portion of the vibrating component that moves beyond the corresponding edge of the stationary component and the exposed portion of the stationary component will not be heated at the same rate as the remaining surfaces at the component interface. Therefore, manufacturing process must take the incongruity of the welds into account such as by machining off a portion of the welded components at the leading edge and the trailing edge of the formed weld.

Moreover, in order to achieve the frequency and amplitude necessary to realize a weld, a LFW device must provide for rapid acceleration from a dead stop. The moving component must then be completely stopped and reaccelerated in a reverse direction. As the size of the vibrated component increases, the momentum that must be controlled becomes problematic. Thus, traditional LFW devices incorporate massive components which are very expensive.

A related limitation of LFW processes is that the relative motion between the two components must be terminated in order for the weld to form properly. Merely removing the motive force does not remove the momentum of the vibrated component. Additionally, any "rebound" or damped vibrations of the moving component as it is immobilized weakens the final weld since the plasticized metals begin to cool as soon as the vibrating movement is reduced.

One approach to solving the need to rapidly immobilize the moving component is to jam the motion-inducing system such as by forcibly inserting a device into the motion inducing system. Freezing the system in this fashion can provide the desired stopping time. This approach, however, results in significant forces being transmitted through the system, necessitating oversized components to be able to withstand the shock. Moreover, the exact position of the vibrated component with respect to the stationary component is not known. Therefore, manufacturing processes must account for a possible position error potentially equal to the amplitude of vibration.

Therefore, a LFW system and method which provides consistent welds is beneficial. A LFW system and method which allows for smaller components within the system would be beneficial. A LFW system and method which reduce the errors associated with the LFW process would be further beneficial.

SUMMARY

The present disclosure in one embodiment is a linear friction welding system including a ram configured to vibrate along a welding axis, a cam follower operably connected to the ram, an eccentric including an eccentric outer periphery operably engaged with the cam follower, and an inner periphery, a first power shaft slidingly engaged with the eccentric, a second power shaft eccentrically engaged with the inner periphery, a timing component operably connected to the first power shaft and the second power shaft, a motor configured to drive the timing component, and a phase change mechanism engaged with the timing component and movable between a first position defining a first phase relationship between the first power shaft and the second power shaft, and a second position defining a second phase relationship between the first power shaft and the second power shaft.

In some embodiments, the timing component includes a timing component load segment between the first power shaft and the second power shaft, the phase change mechanism defines a first timing component load segment length when the phase change mechanism is in the first position, the phase change mechanism defines a second timing component load segment length when the phase change mechanism is in the second position, and the first timing component load segment length is greater than the second timing component load segment length.

In other embodiments, the timing component is operably connected to the first power shaft through a first gear, the timing component is operably connected to the second power shaft through a second gear, and the phase change mechanism includes a third gear operably engaged with the timing component.

In further embodiments, the third gear is operably engaged with the timing component load segment, and the phase change mechanism includes a fourth gear operably engaged with a feed segment of the timing component.

In certain embodiments, the timing component is a timing belt.

In yet another embodiment, the phase change mechanism further includes a carriage rotatably supporting the third gear and the fourth gear, and the carriage is movable by a linear actuator between the first position and the second position.

In another embodiment of the system, the carriage is movable between the first position and the second position along a phase change axis, the phase change mechanism includes a transfer plate fixedly connected to the carriage and to an actuator piston, the transfer plate is arranged to contact a first stop when the carriage is in the first position, and the transfer plate is arranged to contact a second stop when the carriage is in the second position.

In additional embodiments of the system, the first stop is selectably positionable at any one of a first plurality of locations so as to modify the location of the first position along the phase change axis.

In other embodiments of the system, the second stop is selectably positionable at any one of a second plurality of locations so as to modify the location of the second position along the phase change axis.

In yet other embodiments, the first stop comprises a first threaded bolt configured such that rotation of the first threaded bolt moves the first stop from a first of the first plurality locations to a second of the first plurality locations, and the second stop comprises a second threaded bolt configured such that rotation of the second threaded bolt moves the second stop from a first of the second plurality of locations to a second of the second plurality of locations Another embodiment is directed to a method of operating a linear friction welding system that includes a ram configured to vibrate along a welding axis, a cam follower operably connected to the ram, an eccentric including an eccentric outer periphery operably engaged with the cam follower, and an inner periphery, a first power shaft slidingly engaged with the eccentric, a second power shaft eccentrically engaged with the inner periphery, a motor configured to drive one of the first power shaft and the second power shaft, a timing component operably connected to the first power shaft and the second power shaft, and a phase change mechanism engaged with the timing component. The method includes the steps of positioning the phase change mechanism at a first location thereby establishing a phase relationship between the first power shaft and the second power shaft whereat the ram does not vibrate when the first power shaft and the second power shaft rotate, driving the timing component and one of the first power shaft and the second power shaft with the motor while driving the other of the first power shaft and the second power shaft with the timing component, with the phase change mechanism at the first location, establishing a scrub pressure between two components to be welded with the phase change mechanism at the first location, establishing a second phase relationship between the first power shaft and the second power shaft by moving the phase change mechanism to a second location while the first power shaft and the second power shaft are being driven, thereby causing the ram to vibrate along the welding axis while the scrub pressure is applied, establishing the first phase relationship between the first power shaft and the second power shaft by returning the phase change mechanism from the second location to the first location while the scrub pressure is applied, and establishing a forge pressure between the two components with the phase change mechanism returned to the first location.

In some embodiments, moving the phase change mechanism to the second location includes lengthening a timing component load segment.

In other embodiments, lengthening the timing component load segment includes moving a carriage rotatably supporting a gear engaged with the timing component load segment along a phase change axis.

In further embodiments, the carriage is moved toward the second location with a linear actuator.

In certain embodiments, moving the phase change mechanism to the second location comprises stopping movement of the carriage toward the second location with a first stop.

In yet another embodiment, the method further includes the steps of determining a desired ram vibration amplitude, and setting a position of the first stop based upon the desired ram vibration amplitude.

In another embodiment of the method, returning the phase change mechanism includes moving the carriage toward the first location with the linear actuator, and stopping movement of the carriage toward the first location with a second stop.

In additional embodiments of the method, positioning the phase change mechanism at the first location includes positioning the second stop at a location whereat when the carriage contacts the second stop the ram does not vibrate when the first power shaft and the second power shaft rotate.

In other embodiments of the method, setting the position of the first stop includes changing the location of the first stop by rotating a first threaded bolt.

In yet another embodiment, positioning the second stop comprises changing the location of the second stop by rotating a second threaded bolt.

The above described features and advantages, as well as others, will become more readily apparent to those of ordinary skill in the art by reference to the following detailed description and accompanying drawings.

BRIEF DESCRIPTION OF THE DRAWINGS

The present disclosure may take form in various system and method components and arrangement of system and method components. The drawings are only for purposes of illustrating exemplary embodiments and are not to be construed as limiting the disclosure.

DETAILED DESCRIPTION

Figure 1:
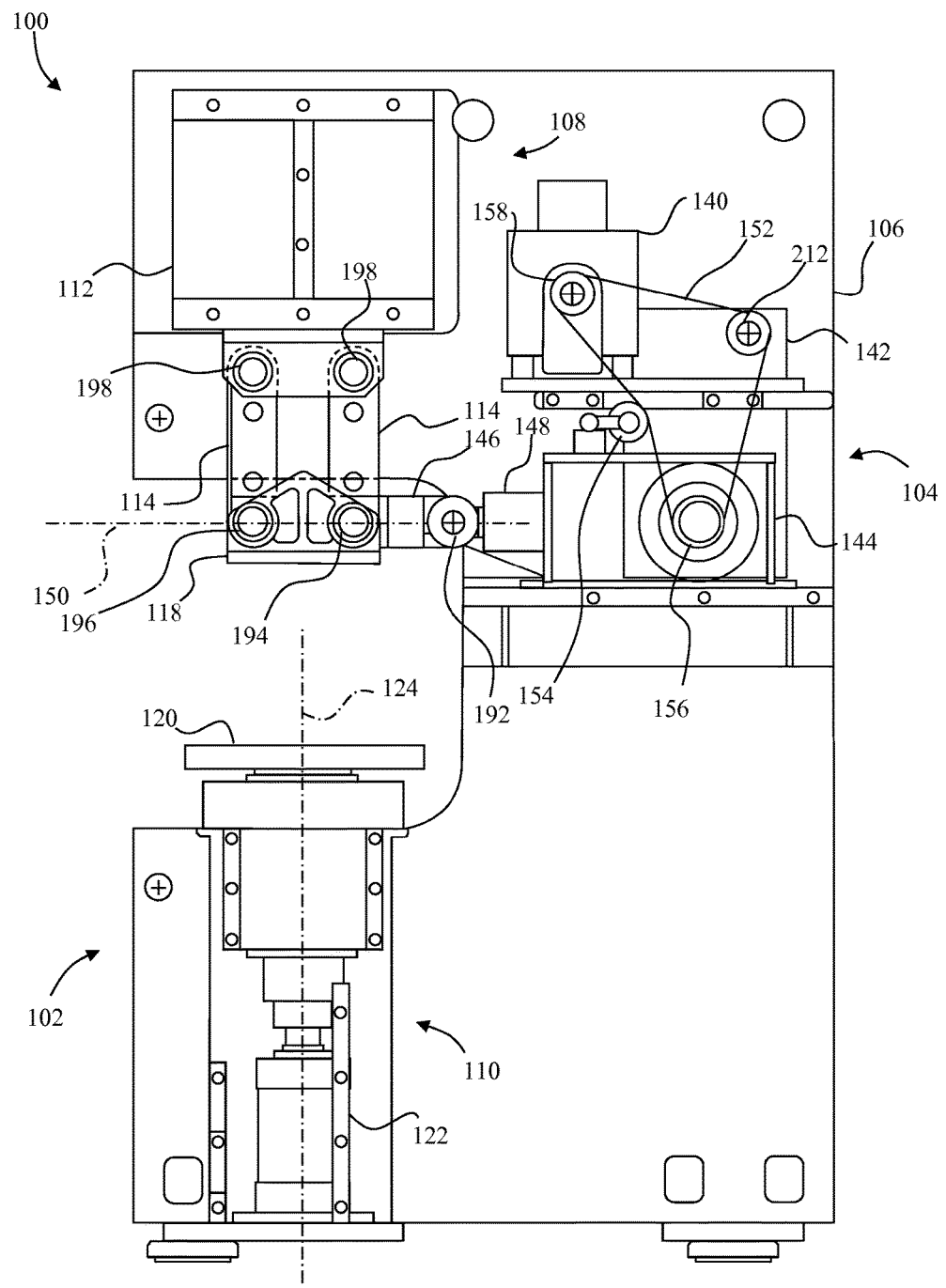
FIG. 1 depicts a partial side plan view of a linear friction welding system in accordance with principles of the disclosure.

Referring to FIG. 1, a linear friction welding system 100 includes a pressing assembly 102 and a vibrating assembly 104 positioned within a frame 106. The pressing assembly 102 includes an upper assembly 108 and a lower assembly 110. The upper assembly includes a base 112, and two rocker arm pairs 114 and 116 supporting a carriage 118 as further shown in FIG. 2.

Figure 2:
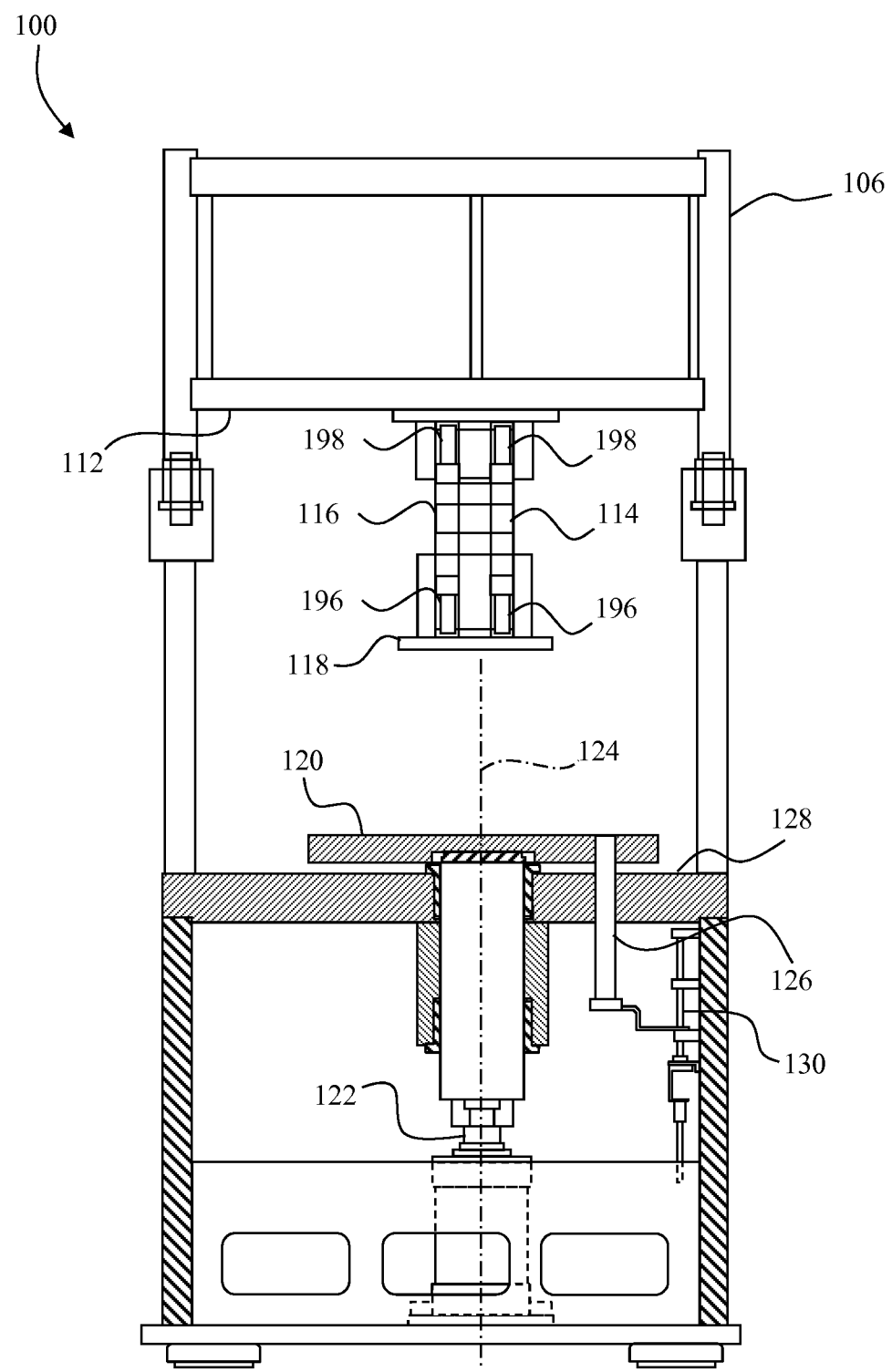
FIG. 2 depicts a partial front cross-sectional view of the system of FIG. 1.

Continuing with FIG. 2, the lower assembly 110 is generally aligned with the carriage 118 and includes a forge platen 120 supported above a main hydraulic press 122. The main hydraulic press 122 defines a press axis 124. An anti-rotation rod 126 extends from the forge platen 120 through a lower support plate 128. A sensor 130 is associated with the anti-rotation rod 126. In one embodiment, the sensor 130 is a linear voltage displacement transducer (LVDT).

Returning to FIG. 1, the vibrating assembly 104 includes a motor 140, a phase change assembly 142, a cam assembly 144, and a ram 146. The ram 146 is pivotably connected to the carriage 118 at a forward end and is pivotably connected to the cam assembly 144 at the opposite end through a connecting rod 148. The ram 146 is configured for movement along a weld axis 150. The motor 140 is connected to the cam assembly 144 and the phase change assembly 142 through a belt 152. A belt tensioner 154 is provided for the belt 152 which is driven by a geared shaft 158 of the motor 140.

Figure 3:
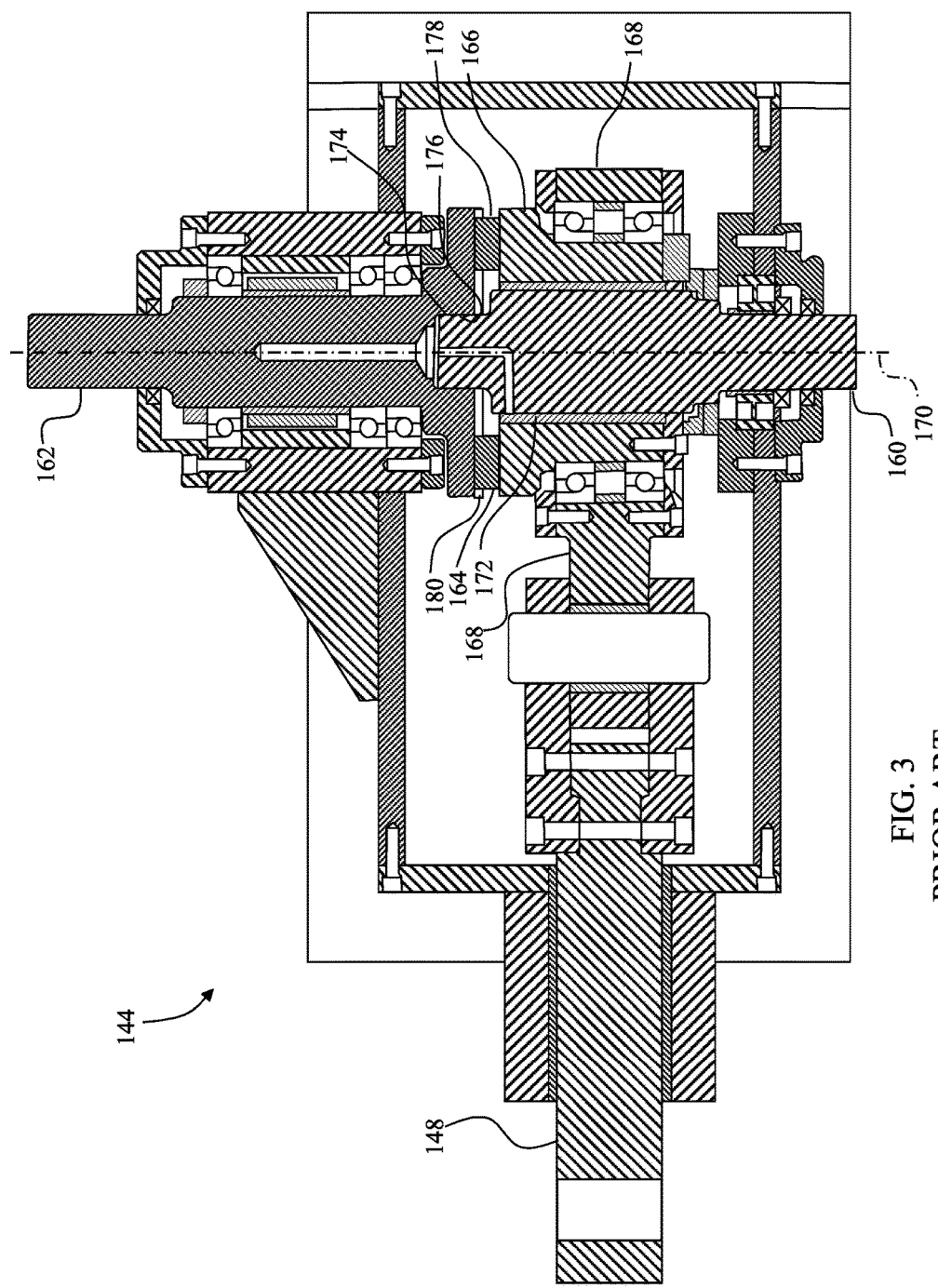
FIG. 3 depicts a top cross-sectional view of the vibrating system of the linear friction welding system of FIG. 1 depicting an eccentric portion of an inner power shaft positioned within an eccentric, with an eccentric outer surface and an outer power shaft engaged with the eccentric.
Figure 4:
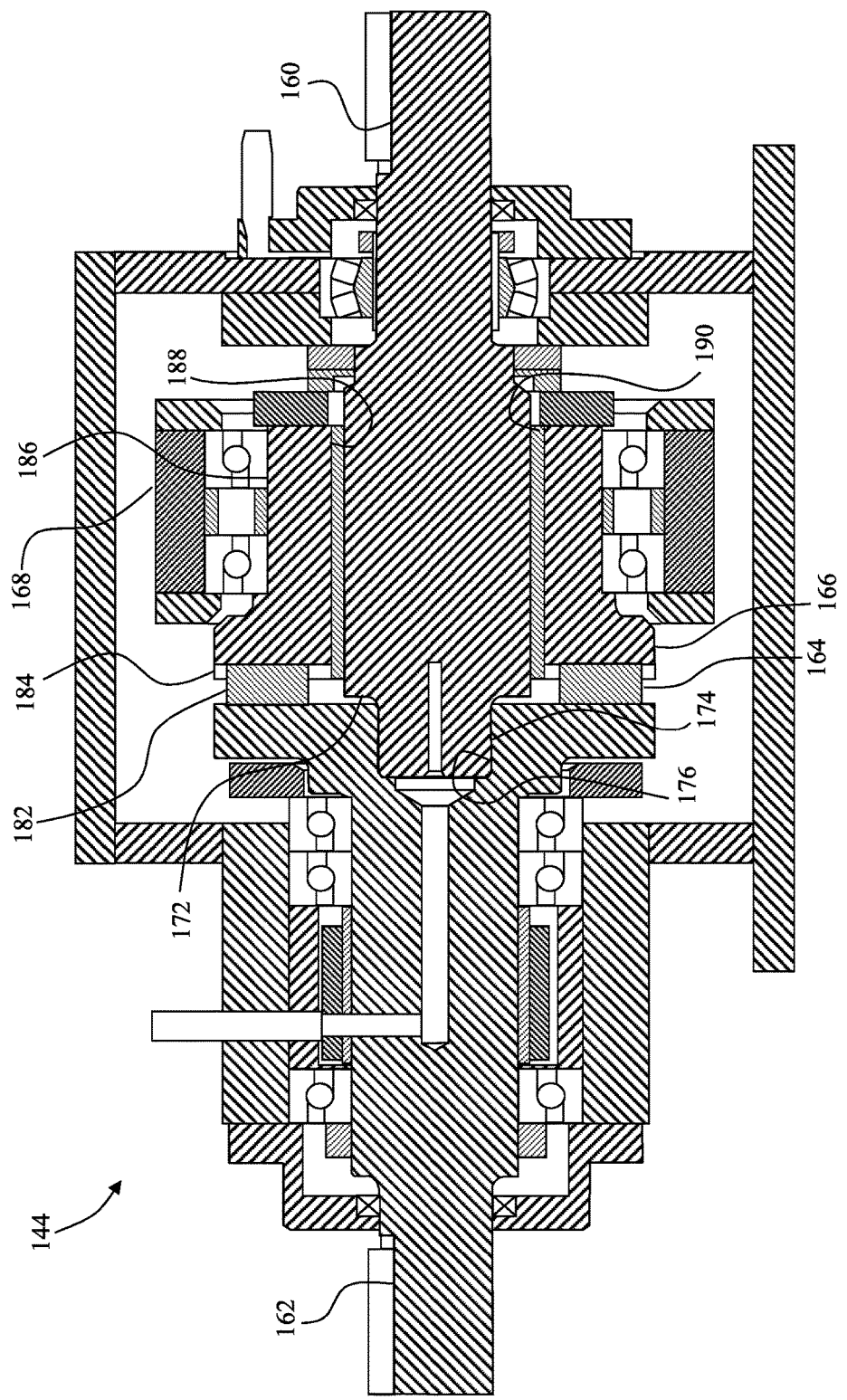
FIG. 4 depicts a front cross-sectional view of the vibrating system of FIG. 3.

The cam assembly 144, shown in more detail in FIGS. 3-4, includes an inner power shaft 160, an outer power shaft 162, a coupler 164, an eccentric 166, and a cam follower 168. The inner power shaft 160, which in one embodiment is a "second power shaft", is operably coupled with the motor 140 through the belt 152 and a gear 156 (see FIG. 1) and rotates about an axis of rotation 170. The inner power shaft 160 includes an eccentric portion 172 and a projection 174. The outer power shaft 162, which in one embodiment is a "first power shaft", is operably coupled with the motor 140 through the belt 152 and the phase change assembly 142, as discussed in further detail below, and also rotates about the axis of rotation 170. The outer power shaft 162 includes a cavity 176 configured to rotatably receive the projection 174. Rotatable engagement of the projection 174 within the cavity 176 keeps both the inner and outer power shafts 160/162 coaxial with the axis of rotation 170.

The coupler 164 is a modified Oldham coupler including one bifurcated tongue 178 which mates with a groove 180 in the outer power shaft 162 (see FIG. 3) and a second bifurcated tongue 182, rotated ninety degrees with respect to the bifurcated tongue 178, which mates with a groove 184 in the eccentric 166 (see FIG. 4). The eccentric 166 further includes an outer eccentric periphery 186 and an inner periphery 188 defining a through-bore 190. The bore 190 is sized to rotationally receive the eccentric portion 172 of the inner power shaft 160. The outer eccentric periphery 186 defines a diameter that is closely fit within the inner diameter of the cam follower 168.

The connecting rod 148 of the cam assembly 144 is pivotably connected to the ram 146 through a pivot 192 (see FIG. 1). The ram 146 is in turn pivotably connected to the carriage 118 through a lower pivot pair 194 (only one is shown). The lower pivot pair 194 also pivotably connects the carriage 118 with a rearward rocker arm of each of the rocker arm pairs 114 and 116. Another lower pivot pair 196 shown in FIGS. 1 and 2 pivotably connects the carriage 118 with a forward rocker arm of each of the rocker arm pairs 114 and 116. Four pivots 198 pivotably connect each of the rocker arms in the rocker arm pairs 114 and 116 to the base 112.

Figure 5:
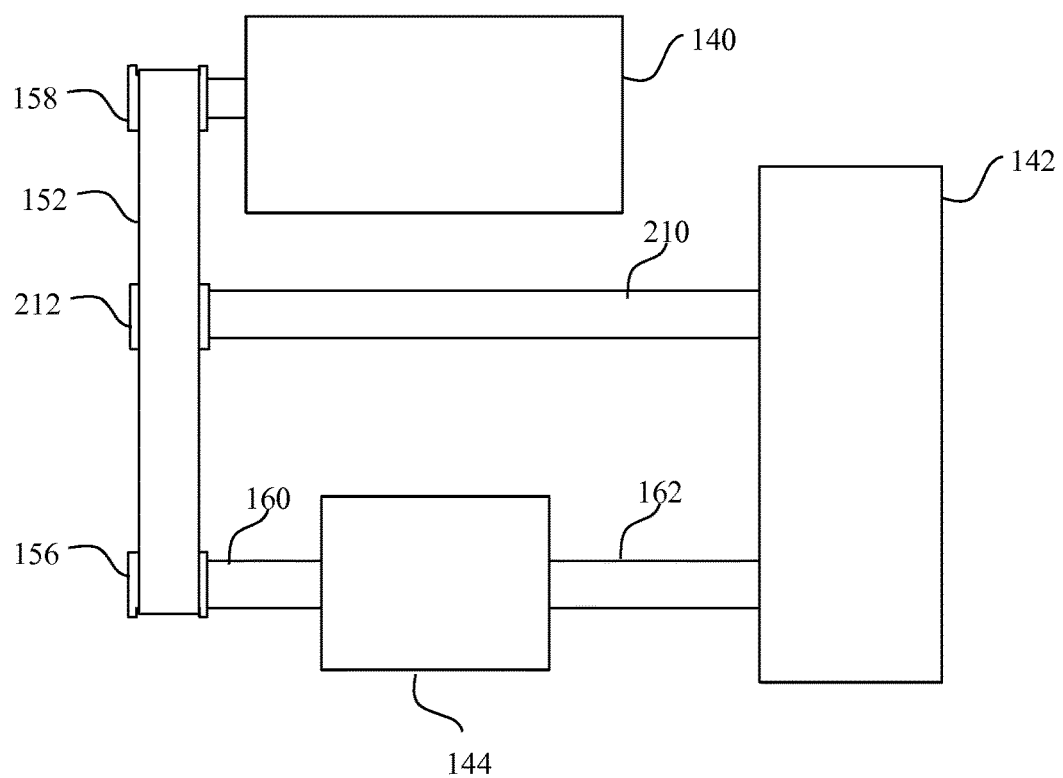
FIG. 5 depicts a rear plan view of the motor, vibrating system and phase change assembly of FIG. 1.
Figure 6:
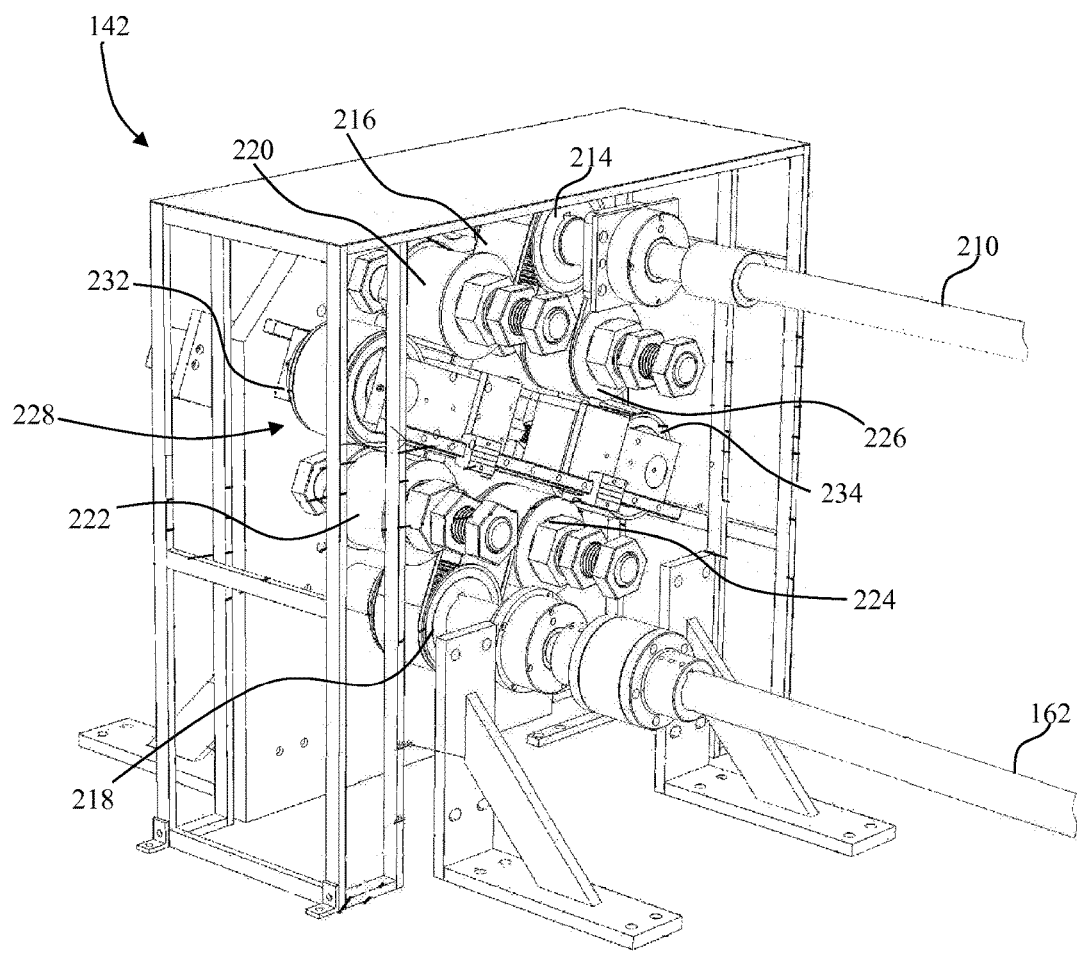
FIG. 6 depicts a perspective view of the interior of the phase change assembly of FIG. 5.

As noted above, the outer power shaft 162 is operably coupled with the motor 140 through the phase change assembly 142. The indirect coupling is described with initial reference to FIG. 5 which shows the belt 152 configured to drive a phase change assembly drive shaft 210 through a gear 212. The shaft 210 drives the outer power shaft 162 through the phase change assembly 142 which is depicted in FIG. 6 with its front wall removed.

The phase change assembly 142 includes a gear 214, which in one embodiment is a first gear, connected to the shaft 210. A timing belt 216 (which in one embodiment is a "second timing component") operably connects the gear 214 with a gear 218, which in one embodiment is a second gear, which is operably connected to the shaft 162. The belt 216 is engaged with four tensioners 220, 222, 224, and 226, and a phase change mechanism 228.

Figure 7:
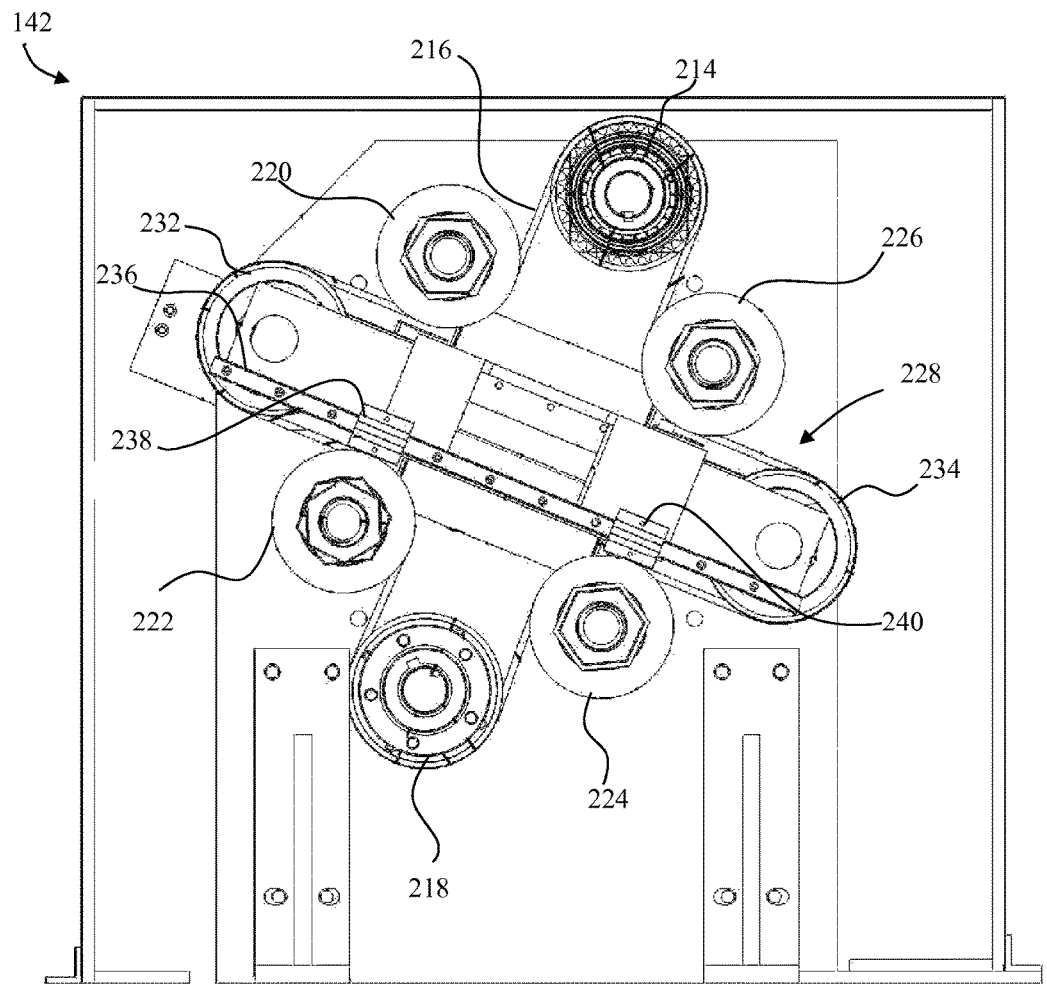
FIG. 7 depicts a plan view of the interior of the phase change assembly of FIG. 6 with the phase change mechanism in a first position.
Figure 8:
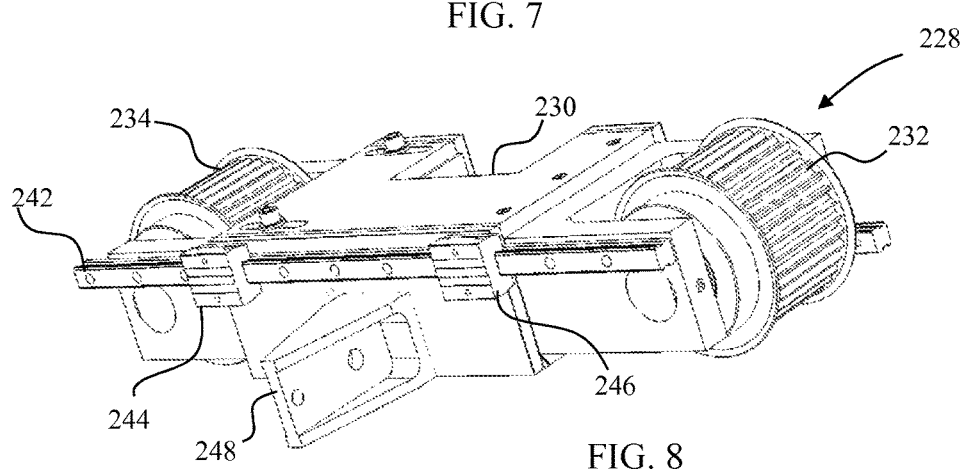
FIG. 8 depicts a perspective view of the phase change mechanism of the phase change assembly depicted in FIG. 7.

The phase change mechanism 228 is further depicted in FIGS. 7 and 8 and includes a carriage 230 which rotatably supports two gears 232 (which in one embodiment is a "fourth gear") and 234 (which in one embodiment is a "third gear"), although in some embodiments a roller is used in place of one of the gears 232 and 234. The carriage 230 is slidably supported within the phase change assembly 142 on one side by rail 236 which slides within guides 238 and 240 (FIG. 7) and on the other side by rail 242 which slides within guides 244 and 246 (FIG. 8). A transfer plate 248 is mounted to, or formed integrally with, the rear side of the carriage 230.

Figure 9:
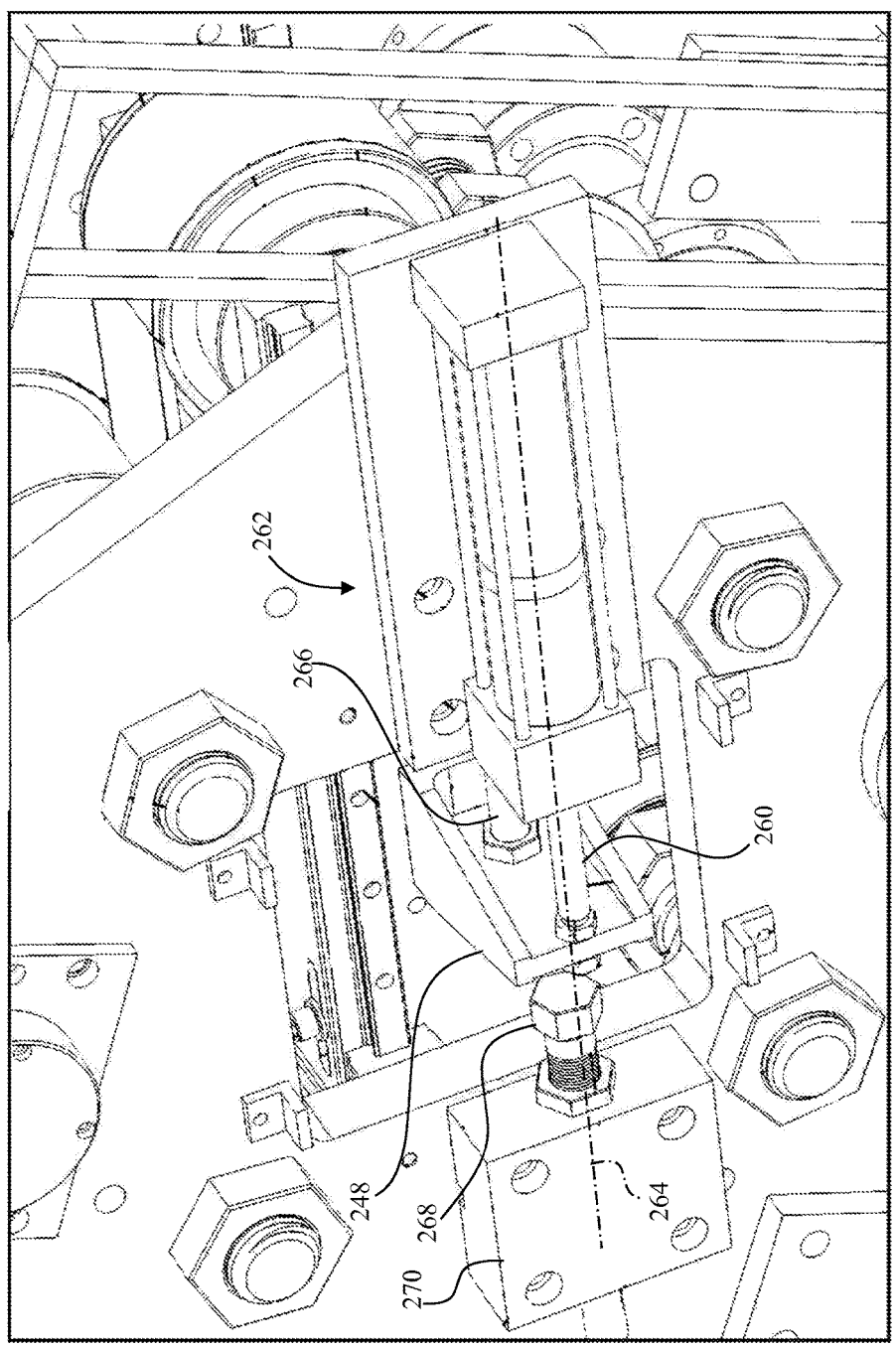
FIG. 9 depicts partial perspective view of the phase change assembly of FIG. 5 depicting the linear actuator and the phase change mechanism.

As shown in FIG. 9, the transfer plate 248 is fixedly connected to a piston 260 of a linear actuator assembly 262.

The linear actuator assembly 262 is mounted to the phase change assembly 142 and oriented to move the carriage 230 along a linear actuator axis 264. The linear actuator assembly 262 is controllable between a first condition which, in the depiction of FIG. 9, urges the piston 260 rightwardly until movement is terminated by a first stop 266, and a second condition which, in the depiction of FIG. 9, urges the piston 260 leftwardly until movement is terminated by a second stop 268. The second stop 268 in this embodiment is a bolt threadedly engaged with a stop mount 270 and the first stop 266 is a bolt threadedly engaged with the linear actuator assembly 262.

Figure 10:
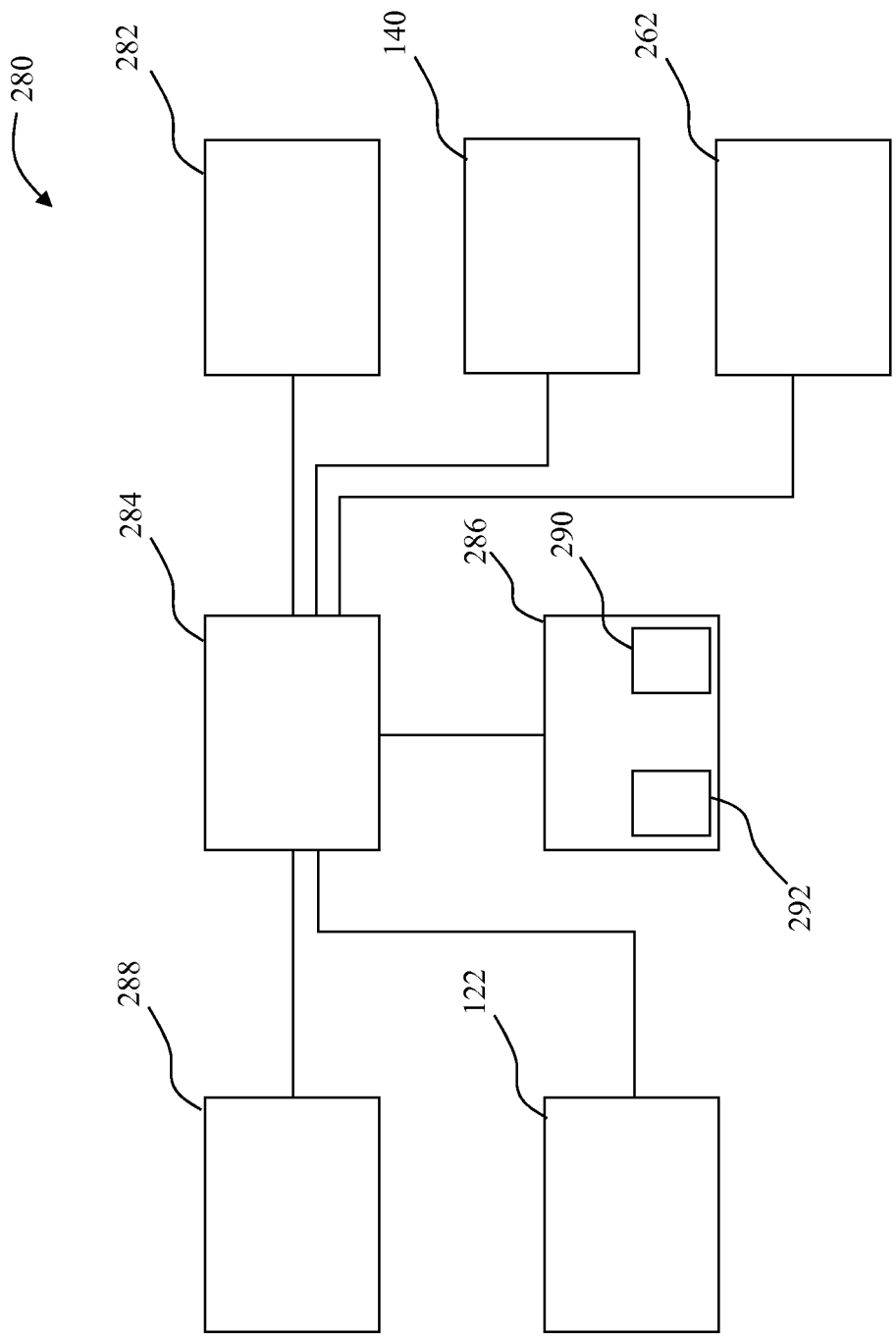
FIG. 10 depicts a schematic view of the control system of the linear friction welding system of FIG. 1.

The linear friction welding system 100 also includes a welding control system 280 depicted in FIG. 10. The control system 280 includes an I/O device 282, a processing circuit 284 and a memory 286. The control system 280 is operably connected to the main hydraulic press 122, the motor 140, the linear actuator assembly 262, and a sensor suite 288. In some embodiments, one or more of the components of the system 280 are provided as a separate device which may be remotely located from the other components of the system 280.

The I/O device 282 in some embodiments includes a user interface, graphical user interface, keyboards, pointing devices, remote and/or local communication links, displays, and other devices that allow externally generated information to be provided to the control system 280, and that allow internal information of the control system 280 to be communicated externally.

The processing circuit 284 may suitably be a general purpose computer processing circuit such as a microprocessor and its associated circuitry. The processing circuit 284 is operable to carry out the operations attributed to it herein.

Within the memory 286 are various program instructions 290. The program instructions 290, some of which are described more fully below, are executable by the processing circuit 284 and/or any other components of the control system 280 as appropriate. Parameter databases 292 are also located within the memory 286.

Many components in the above described linear friction welding system 100 are similar to, and work in like manner as, components in the system described in detail in U.S. Pat. No. 8,376,210, incorporated herein by reference. By way of example, when the inner power shaft 160 has the same relative rotational position as the outer power shaft 162, the relative phase of the inner power shaft 160 and the outer power shaft 162 are said to be matched, which may alternatively be referred to as being in phase, having the same relative phase, or having a system phase angle of zero. With a system phase angle of zero, and with the motor 140 operating, the ram 146 remains motionless. Movement of the ram 146 along the weld axis 150 is effected by controlling the shafts 160 and 162 to establish a non-zero phase angle.

The linear friction welding system 100 differs from the system disclosed in the '210 patent, however, in the manner in which the system phase angle is established while using a single motor. This difference is realized by the incorporation of the phase change assembly 142. Specifically, the belt 152 in one embodiment is a first timing component which rotates the gear 154 and the gear 212 at a fixed phase relationship. While there is a fixed relationship between the gear 154 and the inner power shaft 160, the relationship between the gear 212 and the outer power shaft 162 is variable because of the phase change assembly 142 as discussed with further reference to FIGS. 11 and 12.

Figures 11, 12:
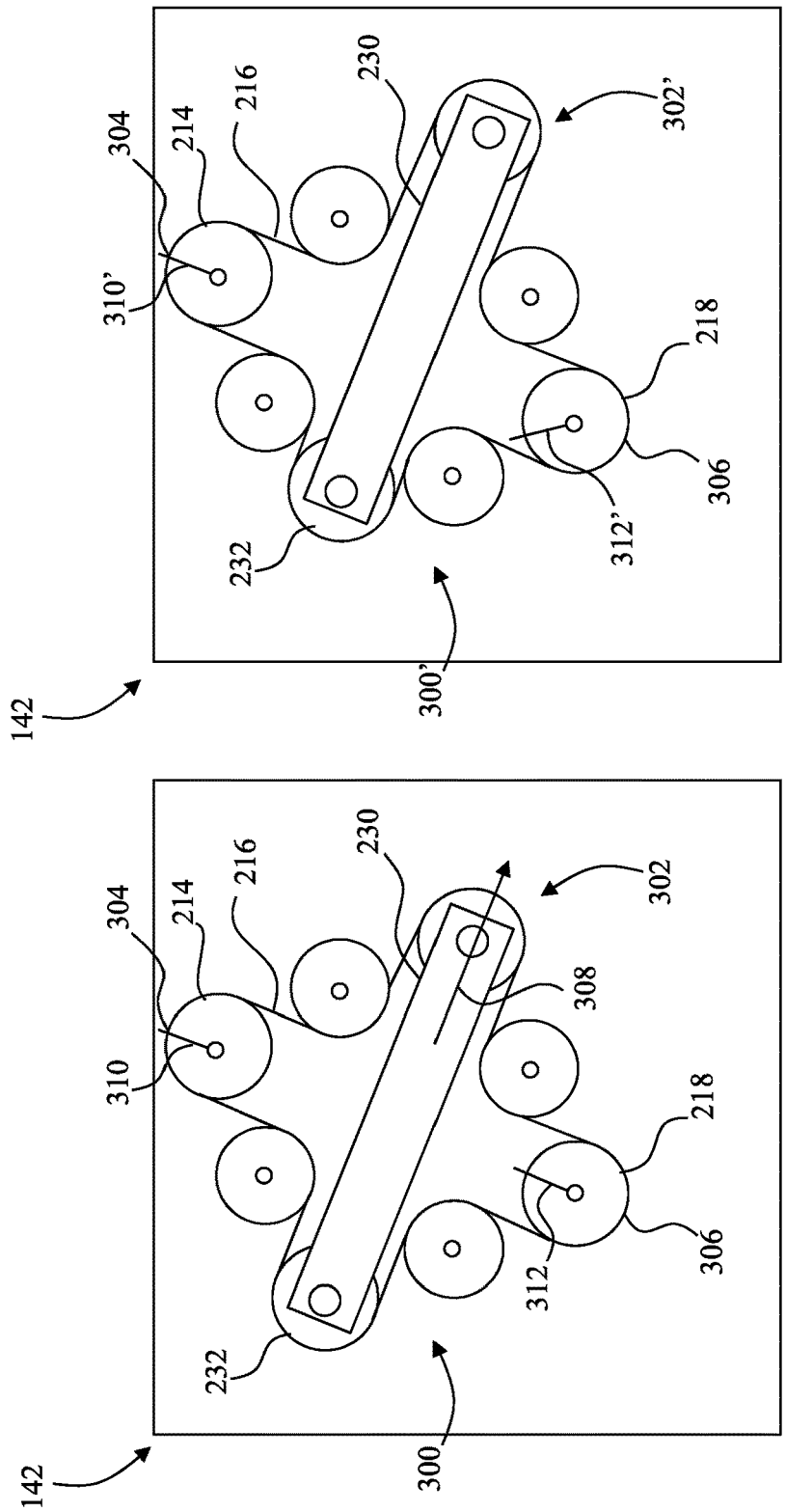
FIG. 11 depicts a simplified plan view of the phase change assembly of FIG. 5 with the phase change mechanism in a first position.
FIG. 12 depicts a simplified plan view of the phase change assembly of FIG. 5 with the phase change mechanism in a second position.

In FIG. 11, the linear actuator assembly 262 has been controlled to drive the transfer plate 248 against the stop 266 (FIG. 9), and the position of the stop 266 has been adjusted by selective threading of the stop 266 into the linear actuator assembly 262 to provide a zero system phase angle. In the condition of FIG. 11, the timing belt 216 is defined by a feed segment 300 and a timing component load segment 302. The feed segment 300 is defined as the portion of the timing belt 216 between the gears 212 and 214 from point 304 at the top of the gear 212 extending along the gear 232 to point 306 at the bottom of the gear 214. The load segment 302 is defined as the portion of the timing belt 216 between the gears 212 and 214 from point 304 at the top of the gear 212 extending along the gear 234 to point 306 at the bottom of the gear 214.

By controlling the phase change mechanism 228 to drive the transfer plate 248 against the stop 268 (FIG. 9), the carriage 230 is driven in the direction of the arrow 308 in FIG. 11 to the position depicted in FIG. 12. In FIG. 12, the length of the load segment 302' of the timing belt 216 is greater than the length of the load segment 300 in FIG. 11. Because both of the gears 212 and 214 are engaged with the belt 216, the belt 216 cannot simply slide past the gears 212 and 214. Rather, at least one of the gears 212/214 must rotate in order to allow for some of the belt 216 on the feed segment 300 to move over to the load segment 302'.

Rotation of the gear 212, however, is effected by the motor 140 through the belt 152 (see FIG. 1). Accordingly, movement of the carriage 230 forces the gear 214 to rotate to allow a portion of the belt 216 to transfer from the feed side 300 to the load side 302'. This is indicated in FIGS. 11 and 12 by schematic marks 310 and 312. As evidenced by comparing the mark 310 in FIG. 11 with the mark 310' in FIG. 12, the rotational position of the gear 212 does not change as the carriage 230 moves. The mark 312' in FIG. 12, however, indicates that the gear 214 has rotated from the location of the gear 214 in FIG. 11 as indicated by the mark 312.

Accordingly, since the shafts 160 and 162 were in phase when the phase change mechanism 228 was in the condition of FIG. 11, the shafts 160 and 162 are out of phase when the phase change mechanism 228 is in the condition of FIG. 12. While the gear 212 was not rotating in the foregoing explanation, those of skill in the art will recognize that the same discussion applies when the gear 212 is rotating. Thus, it is the relative speed of the gear 214 which is momentarily modified by movement of the carriage 230. Consequently, with the motor 140 running, the ram 146 will vibrate along the welding axis 150 as discussed in more detail in the '210 Patent once the carriage moves away from the location of FIG. 11.

In order to stop vibration of the ram 146, the carriage is simply controlled back to the position of FIG. 11, resulting in a momentary slowing of the rotation of the gear 214 forcing the shaft 162 back into phase with the shaft 160. In one embodiment, the linear actuator assembly 262 is configured to selectively direct hydraulic fluid to one side or the other of a disk connected to the piston 260 and within the cylinder of the linear actuator assembly. Accordingly, the carriage is rapidly forced between the positions of FIGS. 11 and 12, and maintained at the desired position with continued hydraulic pressure against the disk to ensure the phasing of the shafts 160/162 does not inadvertently shift.

Figure 13:
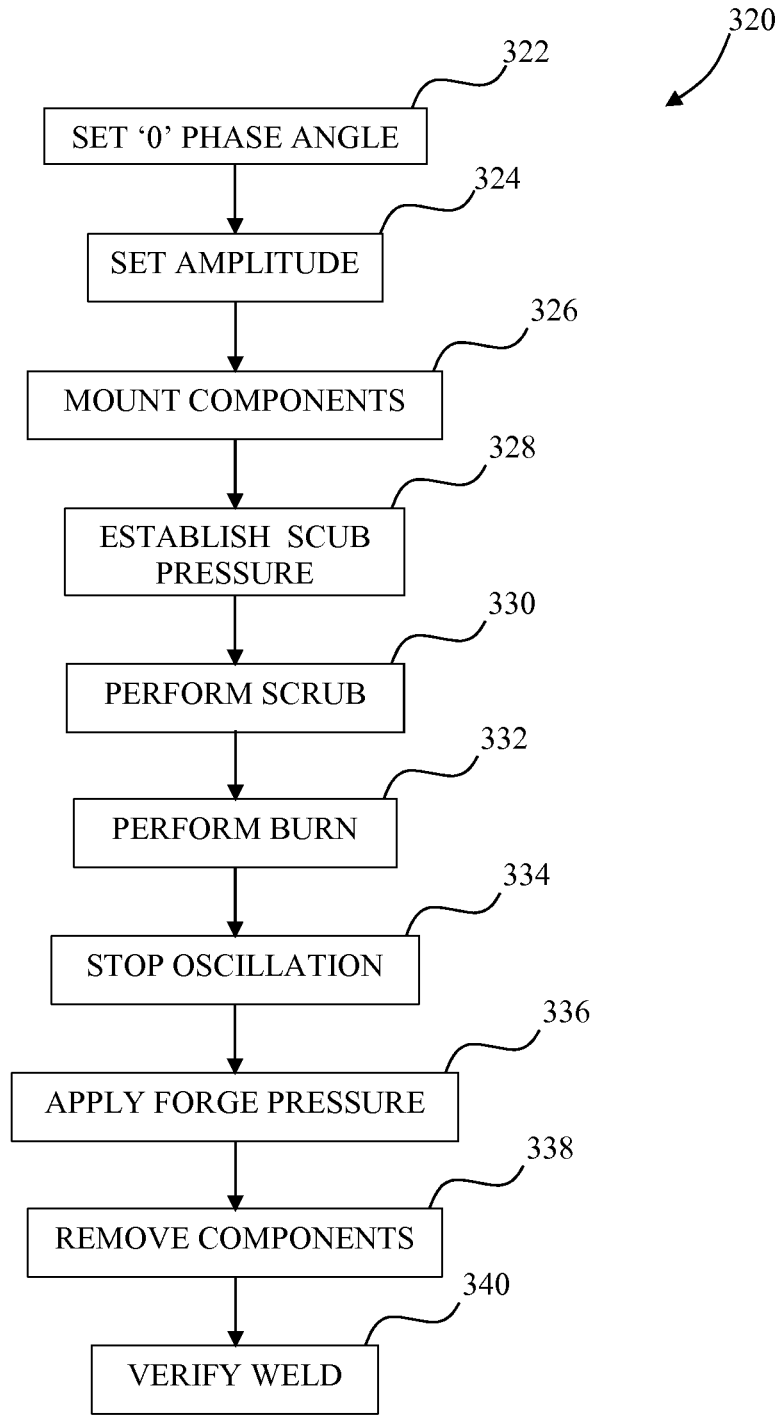
FIG. 13 depicts a procedure that can be executed under the control of the control system of FIG. 10 to form a welded unit with the linear friction welding system of FIG. 1.

Additional details of the linear friction welding system 100 are provided with reference to a method 320 in FIG. 13, portions of which are performed under the control of the control system 280. At block 322, the system phase angle is set to zero with the transfer plate 248 controlled against the stop 266. While a zero system phase angle can be established with the motor 140 de-energized, in one embodiment the motor 140 is energized, and the bolt 266 is rotated until there is no movement of the ram 146.

At block 324 the amplitude for movement of the ram 146 is set. Because there is a fixed relationship between the phasing of the shafts 160/162 and the amplitude of vibration of the ram 146, the distance between the transfer plate 248 and the stop 268 establishes the amplitude of vibration. In one embodiment, a chart is provided which identifies the spatial relationship needed for a desired amplitude. The amplitude is then established by rotation of the stop 268 to the distance associated with the desired amplitude.

One of the components to be welded is then mounted to the forge platen 120 and the other component is mounted to the carriage 118 (block 326). Control of the method 320 is then passed to the control system 280. At block 328 the processing circuit 284 executes program instructions 290 to establish a scrub pressure between the components to be welded. The processing circuit then controls motor 140 to the desired speed associated with the scrub (in some systems only a single speed is available) and controls the linear actuator assembly 262 to drive the transfer plate 248 against the stop 266 to initiate oscillation of the ram 146 and perform a scrub (block 330). The scrub pressure and scrub frequency in some embodiments are parameters stored in the parameter databases 292.

Once the scrub pressure, scrub frequency, and scrub amplitude have been established, a scrub timer is started and counted down using a system clock or other appropriate clock. As the scrub is performed, a "wiping action" is generated by the linear friction welding system 100 as discussed more fully in the '210 patent.

When the desired scrub has been performed at block 330, burn parameters are established in the linear friction welding system 100 at block 332. Specifically, the processing circuit 284 controls the main hydraulic press 122 to achieve a desired burn pressure based upon a value stored in the parameters database 292. The processing circuit 284 further obtains a burn frequency from the parameters database 292 and controls the speed of the motor 140 to a speed corresponding to the desired burn frequency. In one embodiment, all of the changes from the scrub parameters to the burn parameters are controlled to occur substantially simultaneously.

Once the burn pressure and burn frequency, have been established, a burn timer is started and counted down using a system clock or other appropriate clock. During the burn, the processing circuit 284 obtains input from the sensor suite 288 and modifies the speed of the motor 140 as needed to maintain the desired burn frequency and controls the main hydraulic press 122 to maintain the desired burn pressure.

When the burn timer has expired, movement of the ram 146 is terminated at block 334. Movement can be terminated under the control of the processing circuit 284 by controlling the linear actuator 262 to move the phase change mechanism 228 from the second position (FIG. 12) back to the first position (FIG. 11) whereby the relative phase of the inner and outer shafts 160/162 are again matched. The transfer plate 248 is thus forced into contact with the stop 266.

While the motor 140 rotates with no movement of the ram 146, the processing circuit 284 controls the main hydraulic press 122 to establish a forge pressure at block 336 between the two weld components based upon data stored in the parameters database 292. The forge pressure applied to properly burned components which are not moving with respect to one another welds the two components together into a welded unit.

Once the components have been welded, the welded unit is removed (block 338) and the weld verified (block 340). If desired, the processing circuit 284 may be used to determine the weld quality. Specifically, the initial position of the forge platen 120 as the two weld components came into contact can be stored and compared to the position of the forge platen 120 after a weld has been formed. The difference between the two locations indicates a loss of material from the two components at the contact point of the two components.

Additionally, the temperature of the two components can be established, either by sensory input from the sensor suite 288 and/or by historic knowledge of the effects of the scrub and burn processes on the materials of the two components. Furthermore, the actual pressure, frequency, and amplitude of the procedure 320 provide precise information about the amount of energy placed into the components during the procedure 320. Consequently, the foregoing data may be used to calculate the amount of material lost due to flash and the nature of the weld formed.

The linear welding system 100 thus provides precise and independent control of pressure applied as well as the frequency and amplitude of oscillation during the procedure 320. The use of a phase change assembly 142 reduces the number of motors required for operation from other methods. In addition, the phase change assembly 142 allows for the motor to remain on in between welds without movement of the ram.

While the present disclosure has been illustrated by the description of exemplary processes and system components, and while the various processes and components have been described in considerable detail, the applicant does not intend to restrict or in any limit the scope of the appended claims to such detail. Additional advantages and modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general inventive concept.

The invention claimed is:

1. A linear friction welding system, comprising:
 a ram configured to vibrate along a welding axis;
 a cam follower operably connected to the ram;
 an eccentric including an eccentric outer periphery operably engaged with the cam follower, and an inner periphery;
 a first power shaft slidingly engaged with the eccentric;
 a second power shaft eccentrically engaged with the inner periphery;
 a first timing component configured to drive both the second power shaft and a phase change assembly drive shaft;
 a motor configured to drive the first timing component; and
 a phase change assembly driven by the phase change assembly drive shaft, wherein
  (i) the phase change assembly is configured to drive the first power shaft,
  (ii) the phase change assembly is configured to be driven by the first timing component,
  (iii) the phase change assembly is not driven by the second power shaft, and (iv) the phase change assembly is configured to be movable between a first configuration defining a first phase relationship between the first power shaft and the second power shaft, and a second configuration defining a second phase relationship between the first power shaft and the second power shaft.

2. The welding system of claim 1, wherein:
the phase change assembly includes a second timing component with a timing component load segment, the timing component load segment operably connected to the second power shaft through the phase change assembly drive shaft and the first timing component, and the timing component load segment operably connected to the first power shaft;
the phase change assembly defines a first timing component load segment length when the phase change assembly is in the first configuration;
the phase change assembly defines a second timing component load segment length when the phase change assembly is in the second configuration; and
the first timing component load segment length is greater than the second timing component load segment length.

3. The welding system of claim 2, wherein:
the second timing component is operably connected to the first timing component through a first gear;
the second timing component is operably connected to the second power shaft through a second gear; and
the phase change assembly includes a third gear operably engaged with the second timing component.

4. The welding system of claim 3, wherein:
the third gear is operably engaged with the second timing component load segment; and
the phase change assembly includes a fourth gear operably engaged with a feed segment of the second timing component.

5. The welding system of claim 4, wherein the second timing component is a timing belt.

6. The welding system of claim 4, wherein:
the phase change assembly further includes a carriage rotatably supporting the third gear and the fourth gear; and
the carriage is movable by a linear actuator between a first position associated with the first configuration and a second position associated with the second configuration.

7. The welding system of claim 6, wherein:
the carriage is movable between the first position and the second position along a phase change axis;
the phase change assembly includes a transfer plate fixedly connected to the carriage and to an actuator piston;
the transfer plate is arranged to contact a first stop when the carriage is in the first position; and
the transfer plate is arranged to contact a second stop when the carriage is in the second position.

8. The welding system of claim 7, wherein:
the first stop is selectably positionable at any one of a first plurality of locations so as to modify the location of the first position along the phase change axis.

9. The welding system of claim 8, wherein:
the second stop is selectably positionable at any one of a second plurality of locations so as to modify the location of the second position along the phase change axis.

10. The welding system of claim 9, wherein:
the first stop comprises a first threaded bolt configured such that rotation of the first threaded bolt moves the first stop from a first of the first plurality locations to a second of the first plurality locations; and
the second stop comprises a second threaded bolt configured such that rotation of the second threaded bolt moves the second stop from a first of the second plurality of locations to a second of the second plurality of locations.

* * * * *